Dec. 26, 1961    HIDEO ARITA ETAL    3,014,782
METHOD OF RECOVERING AMMONIUM CHLORIDE
Filed Sept. 22, 1958
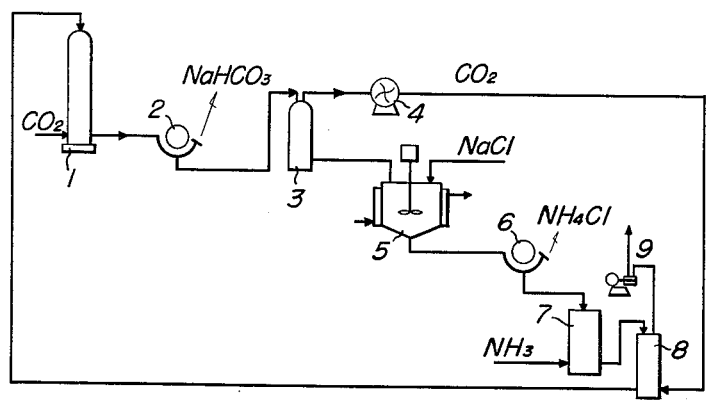
HIDEO ARITA &
HIROYUKI KUSAKA    INVENTORS
BY WENDEROTH
LIND & PONACK 3,014,782
METHOD OF RECOVERING AMMONIUM CHLORIDE
Hideo Arita and Hiroyuki Kusaka, Tokyo, Japan, assignors to Asahi Kasei Kogyo Kabushiki Kaisha, Osaka, Japan, a corporation of Japan
Filed Sept. 22, 1958, Ser. No. 762,280
Claims priority, application Japan Oct. 1, 1957
6 Claims. (Cl. 23—100)

The invention relates to a method for recovering ammonium chloride, which is not contaminated with sodium bicarbonate, from the liquor filtered off from solid sodium bicarbonate obtained by the Solvay (ammonia-soda) process.

Ammonium chloride may also be produced in the ammonia-soda process from the waste calcium chloride liquor which is a final product in sodium carbonate production. This liquor is treated with ammonia and carbon dioxide to separate calcium carbonate (solid) from ammonium chloride solution. Alternatively, there has been proposed a method of separating $NH_4Cl$ as solid by adding sodium chloride to the liquor obtained by the Solvay process and cooling the mixture by any means (Schreib process). In this process, it is necessary to increase the difference between the temperature at which sodium bicarbonate separates and that at which ammonium chloride precipitates. If the temperature difference is of the general order of 10° C, the amount of ammonium chloride obtainable from one liter of the liquor is only 1 to 1.5 mols. However, if the temperature difference is 20° C., the amount of ammonium chloride obtainable from one liter of the liquor is increased to 2 to 2.3 mols.

The separating temperature of sodium bicarbonate is usually about 30° C., and difficulties are encountered in practical operation when this temperature is raised, for example, to 35° or more. Therefore, it is desirable to lower the precipitating temperature of ammonium chloride to below 20° C., preferably to 15° to 5° C., to increase the above mentioned temperature difference. However, it is very difficult from the commercial standpoint to cool a large amount of liquor to below 20° C., e.g. to between 15° to 5° C., especially where the temperature of the cooling water tends to increase to 25° C. or more and a massive refrigerator is required. This is a most serious problem in industry due to the excessive costs of construction and power.

In order to overcome these difficulties still another method has been proposed which comprises allowing the liquid filtered from sodium bicarbonate to absorb a large amount of ammonia, cooling the liquor, and adiabatically evaporating ammonia under vacuum to cool down the liquor. However, this method needs a massive vacuum pump to evaporate a large amount of ammonia under vacuum and increase the pressure to introduce it into an absorption tower. Moreover, the addition of ammonia induces an increase in the temperature of the liquor, whereby the costs of construction and power becomes larger, and the ammonia tends to be lost. This method, therefore has difficulties similar to those of the provision of the above mentioned refrigerator.

It is also noted that in any of the above methods, ammonium chloride tends to be contaminated with sodium bicarbonate, as the latter may precipitate together with the former.

It is an object of this invention to provide a method of recovering $NH_4Cl$ which has been produced in the Solvay process. Addition of as much ammonia and provision of cooling devices which are as large as those usually used in the prior art are not required. The addition of ammonia and provision of cooling devices may be entirely omitted.

It is another object of this invention to provide a method of recovering $NH_4Cl$ free from sodium bicarbonate which has been produced in the Solvay process.

It is still another object of this invention to provide a method of utilizing the escape of $CO_2$ gas included in the liquor filtered from sodium bicarbonate produced in the Solvay process and lowering the temperature of the liquor without the provision of special cooling devices so that the precipitation of $NH_4Cl$ is made easier.

According to the invention, a positive attempt is made to accelerate the escape of $CO_2$ while maintaining under reduced pressures the filtrate which has been stripped of sodium bicarbonate produced in the Solvay process and which has been cooled by water. This results in the decrease of the temperature of the liquor and the control of pH at from 8 to 9, under which conditions chloride is separated and can be recovered. During the process sodium chloride is added before the cooling step or after control of pH.

The starting material to be used in the invention is a sodium bicarbonate mother liquor obtained from the stage of the Solvay process in which sodium bicarbonate previously produced is separated from the said mother liquor by a filtration, the filtrate of which constitutes the said starting material. This mother liquor contains predominantly $NH_4Cl$. Other materials contained therein are unreacted $NaCl$, unprecipitated $NaHCO_3$, and $NH_4HCO_3$ which has been produced from $NH_3$, $CO_2$ and $H_2O$.

The material liquor may preferably be composed of 1.5 to 2.5 mol/l. of the total sodium salt (the above mentioned $NaCl$ plus $NaHCO_3$) and 0.6 to 1.2 mol/l. of the total alkaline value as bicarbonate of ($NaHCO_3$ plus $NH_4HCO_3$). Also it is desirable that it have a pH of not more than 7.5. The amount of ammonia and of carbon dioxide to be reacted with sodium chloride in the liquor is controlled so that the above composition may be obtained. That there are comparatively a large amount of the total sodium and a small amount of the alkaline value in the material liquor means that there are small amounts of dissolved and unrecovered sodium bicarbonate and sodium carbonate in the liquor. This favors the hindrance of contamination with sodium bicarbonate of ammonium chloride to be recovered even if there is little carbon dioxide evacuated from a mother liquor as hereinafter set forth.

The material liquor is first cooled. The cooling is done with water. The temperature of the liquor is lowered by means of the escape of $CO_2$ as described hereinafter, but the decrease of temperature made by the treatment is of the general order of 10° C. at most. Accordingly, the material liquor is cooled with water as described above.

The material liquor thus cooled is caused to drop down in a misty form through a reaction vessel which is maintained under reduced pressure (20 to 60 mm. Hg) so that $CO_2$ in the liquor may be vaporized. Water is also vaporized together with $CO_2$. By the vaporization the temperature of the liquor is positively lowered. The material liquor at 15°–20° C. is cooled down to 5°–10° C. The pH of the liquor is gradually increased to the value between 8 and 9, preferably from 8.4 to 8.6, due to the escape of $CO_2$. As the natural evolution of $CO_2$ takes a considerable time, it becomes necessary to resort to such a means as above to favor the escape of $CO_2$. The $CO_2$ gas is thus introduced either into a step of the Solvay process in which $NaHCO_3$ is produced from the above-mentioned liquor after $NH_4Cl$ has been filtered off therefrom, but which liquor still contains unreacted $NaCl$, $NaHCO_3$ and $NH_4HCO_3$ or to a step of in the Solvay process in which $NaHCO_3$ is produced from the NaCl, which has been added to the above-described liquor, by adding thereto $NH_3$ and $CO_2$. The evolved $CO_2$ and water vapor are absorbed in an ammoniacal solution in a separate vessel under reduced pressure, whereby $CO_2$ is recovered with formation of ammonium bicarbonate, as stated hereinbefore, and the reduced pressure of the system is maintained. The above-mentioned ammoniacal solution is obtained from a liquor containing the final product mixture of the Solvay process, namely $NH_4Cl$ + $NaHCO_3$, from which liquor $NH_4Cl$ has been filtered off, by the addition of $NH_3$ thereto. The temperature decrease and the pH increase of the liquor are also brought about sponataneously. The amount of $CO_2$ vaporized may vary with the composition of the liquor. When the alkaline value of the material liquor is 0.8 mol/l. as bicarbonate, 0.3 to 0.5 mol/l. of $CO_2$ may preferably be vaporized. When the alkaline value of the material liquor is 1.2 mols/l. as bicarbonate, the preferable amount of $CO_2$ to be vaporized is 0.6 to 0.8 mol/l. In order to effect the vaporization of $CO_2$ from the material liquor, other methods than the above method can be employed, but the above described method is optimum from an industrial standpoint. In any case the method of the invention may not suitably be accomplished if the temperature of the liquor is increased in this step. This step is based upon the fact that the vapor pressure of $CO_2$ is large while the vapor pressure of ammonia is small with respect to that of the mother liquor. Thus, $CO_2$ and water may predominantly be removed from the material liquor.

The liquor thus treated (pH 8 to 9, temperature about 5° C.) is very favorable to the precipitation of $NH_4Cl$, and by addition of sodium chloride to the extent of saturation, $NH_4Cl$ which does not contain sodium bicarbonate may be precipitated. As water in the material liquor may also be removed in the above $CO_2$ stripping step, the material liquor becomes concentrated and $NH_4Cl$ may be precipitated to a certain extent even if sodium chloride is not added. However, if NaCl is added at about 5° C., as described, to the extent of saturation, the precipitation of $NH_4Cl$ may be increased. This is to be understood from the solubility curves of $NH_4Cl$ and NaCl in the binary system. Sodium bicarbonate does not precipitate at the above described values of pH and temperature but is present in solution. Sodium chloride may be added to the material liquor from which sodium bicarbonate has been filtered off, but in the practice of the present invention it is preferable to add sodium chloride in the $NH_4Cl$ precipitating step. In order to practice the present invention in a more efficient manner it is recommended that the liquid containing ammonium bicarbonate, or ammonia and carbon dioxide, or solid ammonium bicarbonate be added to the starting liquor whereupon the foregoing steps are effected. In this case, the cooling effect of the material liquor becomes so large that the amount of ammonium chloride precipitated may be increased. Thus, in the case wherein the alkaline value after separation of sodium bicarbonate is 0.8 mol/l. as bicarbonate, when ammonium bicarbonate is added thereto in an amount of 0.4 mol/l. the cooling effect of the material liquor is increased about 50% and the precipitating amount of ammonium chloride is increased about 20% as compared with the case wherein no ammonium bicarbonate is added.

The above-described process according to the invention is diagrammatically represented in the accompanying drawing in which reference numeral 1 indicates a conventional reactor of the Solvay process in which there is produced a slurry of sodium bicarbonate in a mother liquor containing dissolved a small portion of the sodium bicarbonate as well as a major portion of ammonium chloride and some unreacted ammonium bicarbonate. In the filter 2, the undissolved bulk of sodium bicarbonate is separated from the mother liquor which latter constitutes the starting material in applicants' process. The mother liquor which has usually a temperature of about 30° and has a pH of neutral to maximally about 7.5, flows on the vacuum $CO_2$-separation tower 3, in which it is stripped from carbon dioxide exclusively by reducing the pressure above the mother liquor until decomposition mainly of ammonium bicarbonate in the mother liquor takes place. This is the case at about 20 to 60 mm. Hg. The developing carbon dioxide is discharged from the tower under the action of a pump 4, whereby the pH of the decarbonated mother liquor rises to a range of about 8 to 9, while, at the same time, the temperature of the liquor decreases due to the consumption of heat from the same by the decomposition reaction of ammonium bicarbonate and by the evaporation of carbon dioxide. If necessary, the decarbonated liquor is further cooled, until its temperature is within the range of 5° to 15° C. and preferably 5° to 10° C., and transferred to the reactor 5 in which sodium chloride is added to the liquor in excess over the amount required to precipitate ammonium chloride free from sodium bicarbonate from the liquor. The precipitated $NH_4Cl$ is separated from the residual sodium bicarbonate dissolved in the latter, by means of centrifugal separator 6. The exhausted end liquor can be further treated, by introducing ammonia thereinto in the $NH_3$-absorber 7, in which reduced pressure is generated by means of vacuum pump 9. Carbon dioxide from tower 3 is also transported via pump 4 into the $NH_3$-absorber and the resulting ammonium bicarbonate-containing product can then be recycled into the process at 1.

The following examples are only illustrative, and the present invention is not limited thereto.

*Example 1*

One liter of mother liquor containing 4.1 mol/l. as total sodium and 0.85 mol/l. as bicarbonate of alkaline value and saturated at 5° C. with sodium chloride and ammonium chloride is added with 2.2 mols of ammonia, with which carbon dioxide is absorbed to the extent of saturation to obtain a slurry of pH 7.1 at 30° C. The slurry containing sodium bicarbonate is filtered under reduced pressure, thus producing a separation liquid containing 0.8 mol/l. of alkaline value as sodium bicarbonate and 1.8 mol/l. of sodium salt. The separation liquid is stripped of carbon dioxide under reduced pressure of 35 mm. Hg, then cooled down to 5° C., the pH being adjusted to 8.6. Sodium chloride is added in a ratio of 2.2 mols to one liter of mother liquor to precipitate ammonium chloride. Analysis after separation of ammonium chloride by a centrifugal separator shows that no crystalline sodium bicarbonate is present in the ammonium chloride.

*Example 2*

Example 1 is repeated to produce sodium bicarbonate. The mother liquor from which the sodium bicarbonate has been separated contains 1.8 mols/l. of sodium salt and 0.95 mol/l. of alkaline value as bicarbonate, and has a pH of 7.4. After sodium chloride is added thereto in a ratio of 2.2 mols to one liter of mother liquor, it is cooled down to 20° C., and carbon dioxide and water are vaporized under reduced pressure of 40 mm. Hg. The gases generated are introduced by means of diffusion into a tower and absorbed thereby to maintain the reduced pressure as described while a mixing solution of sodium chloride and ammonium chloride containing 1.8 mol/l. of ammonia is caused to flow down under reduced pressure through the tower. The temperature of the liquor is reduced to 10° C. due to the vaporization of carbon dioxide and water and the pH changes to 8.5. The liquor is further cooled to 5° C., and ammonium chloride is separated by a centrifugal separator. No crystalline sodium bicarbonate is found in the ammonium chloride.

Example 3

Sodium bicarbonate is produced in the same manner as Example 1, which is then filtered off to leave a separation liquor containing 0.8 mol/l. of alkaline value as bicarbonate and 1.8 mol/l. of sodium salt. After addition of ammonium bicarbonate in a ratio of 0.4 mol to one liter of mother liquor, carbon dioxide is separated under reduced pressure of 35 mm. Hg. The pH of the liquor is adjusted to 8.6 while cooling, and 2.5 mols of sodium chloride is added to precipitate ammonium chloride. Analysis after separation of ammonium chloride by a centrifugal separator shows that there is no crystalline sodium bicarbonate present in the ammonium chloride.

Example 4

To the liquor free from solid sodium bicarbonate which contains 2.2 mols/l. of sodium salt and 0.95 mol/l. of alkaline value as bicarbonate and has a pH of 7.4 there is added sodium chloride in a ratio of 2.2 mols per liter of the liquor. After cooling the liquor to 20° C., carbon dioxide and water are caused to vaporize under reduced pressure of 40 mm. Hg while the generating gases are introduced into the tower as described in Example 2 by means of diffusion and absorbed thereby to maintain the above described reduced pressure. The temperature of the liquor from which carbon dioxide and water are discharged is lowered to 10° C. and the pH thereof changes to 8.5. The crystals of ammonium chloride obtained therefrom are completely free from sodium bicarbonate.

What we claim is:

1. A method of recovering ammonium chloride from a mother liquor of the ammonia-soda process from which sodium bicarbonate has been separated and which contains ammonium chloride and residual sodium bicarbonate and ammonium bicarbonate, which comprises (a) subjecting the said liquor to reduced pressure of 20 to 60 mm. Hg whereby the remaining ammonium bicarbonate is decomposed, (b) discharging carbon dioxide gas generated due to the aforesaid decomposition until the pH of the solution is from 8 to 9, (c) cooling the treated solution to a temperature between 5° and 15° C., (d) dissolving sodium chloride in the cooled solution to saturation whereby ammonium chloride free from sodium bicarbonate is precipitated from the liquor in which sodium bicarbonate remains dissolved, and (e) separating the precipitated ammonium chloride from the residual liquor.

2. A method as described in claim 1, wherein said step (c) of cooling said solution consists exclusively of said decomposition of ammonium bicarbonate in, and said evaporation of carbon dioxide from, said solution, said decomposition and evaporation decreasing the heat content of said solution adiabatically.

3. A method according to claim 1 in which the amount of sodium chloride is such that sodium chloride is constantly present in excess over the amount actually needed for precipitation.

4. A method according to claim 1 in which ammonia is introduced for absorption into the said residual liquor, and wherein carbon dioxide gas resulting principally from the decomposition of ammonium bicarbonate in the step (a) is introduced under reduced pressure into the resulting ammoniacal residual liquor and absorbed therein, thereby producing additional ammonium bicarbonate.

5. A method as described in claim 1, further comprising adding to the starting liquor, prior to subjecting the same to the treatment of step (a), a member selected from the group consisting of ammonium bicarbonate and a mixture of ammonia and carbon dioxide, thereby increasing the cooling effect of step (c) and the yield of ammonium chloride precipitated free from sodium bicarbonate in step (d).

6. A method of recovering ammonium chloride from a mother liquor, of the ammonia-soda process from which sodium bicarbonate has been separated and which contains ammonium chloride and residual sodium bicarbonate and ammonium bicarbonate, which comprises (a) subjecting the said liquor to reduced pressure of 20 to 60 mm. Hg at a temperature of about 30° C. and at a pH of maximally 7.5 whereby the remaining ammonium bicarbonate is decomposed, (b) discharging carbon dioxide gas generated due to the aforesaid decomposition until the pH of the solution is from 8 to 9, (c) cooling the treated solution to a temperature between 5° and 15° C., (d) dissolving sodium chloride in the cooled solution to saturation whereby ammonium chloride free from sodium bicarbonate is precipitated from the liquor retaining dissolved sodium bicarbonate, and (e) separating the precipitated ammonium chloride which crystallizes out.

References Cited in the file of this patent

UNITED STATES PATENTS

| 1,913,372 | Cole | June 13, 1933 |
| 2,666,686 | Miller et al. | Jan. 19, 1954 |
| 2,843,454 | Devaux et al. | July 15, 1958 |

FOREIGN PATENTS

| 131,870 | Great Britain | Feb. 12, 1920 |